United States Patent
Rajamanickam et al.

(10) Patent No.: US 9,715,441 B2
(45) Date of Patent: *Jul. 25, 2017

(54) RISK-BASED TEST COVERAGE AND PRIORITIZATION

(71) Applicant: International Business Machines Corporation, Armonk, NY (US)

(72) Inventors: Logeswaran T. Rajamanickam, Kunnathur (IN); Arun Ramakrishnan, Chennai (IN); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,776

(22) Filed: Jan. 4, 2017

(65) Prior Publication Data

US 2017/0109264 A1    Apr. 20, 2017

Related U.S. Application Data

(63) Continuation of application No. 15/220,465, filed on Jul. 27, 2016, now Pat. No. 9,558,104, which is a continuation of application No. 14/251,845, filed on Apr. 14, 2014, now Pat. No. 9,507,695.

(51) Int. Cl.
*G06F 11/36* (2006.01)

(52) U.S. Cl.
CPC ........ *G06F 11/3676* (2013.01); *G06F 11/368* (2013.01); *G06F 11/3684* (2013.01)

(58) Field of Classification Search
None
See application file for complete search history.

(56) References Cited

U.S. PATENT DOCUMENTS

| | | |
|---|---|---|
| 5,297,150 A | 3/1994 | Clark |
| 5,758,061 A | 5/1998 | Plum |
| 8,056,060 B2 | 11/2011 | Bicheno et al. |

(Continued)

OTHER PUBLICATIONS

Srivastava et al., "Effectively prioritizing tests in development environment," 2002, Proceedings of the 2002 ACM SIGSOFT international symposium on Software testing and analysis, pp. 97-106.*

(Continued)

*Primary Examiner* — Thuy Dao
*Assistant Examiner* — Stephen Berman
(74) *Attorney, Agent, or Firm* — Daniel R. Simek

(57) ABSTRACT

A processor receives a rule containing a first set of code statements. The processor compares the first set of code statements of the rule to a second set of code statements of a plurality of code statements of source code. The processor responds to a match of the first set of code statements of the rule and the second set of code statements of the plurality of code statements of the source code, by applying a weight modifier to the rule, which adds a weighted value to the rule, and the processor, in response to a second matching of the first set of code statements of the rule to the second set of code statements of the plurality of code statements of the source code, applies the weight modifier to the rule, which includes a weighted value, and the weight modifier adjusts the weighted value of the rule.

1 Claim, 5 Drawing Sheets

(56) References Cited

U.S. PATENT DOCUMENTS

| | | | |
|---|---|---|---|
| 8,276,123 B1* | 9/2012 | Deng | G06F 11/368 714/37 |
| 8,561,036 B1 | 10/2013 | Beans et al. | |
| 8,739,128 B1 | 5/2014 | Cohen et al. | |
| 8,898,647 B2 | 11/2014 | Sobolev et al. | |
| 9,170,926 B1 | 10/2015 | Cohen et al. | |
| 9,317,401 B2 | 4/2016 | Bartley et al. | |
| 9,430,362 B1 | 8/2016 | Elgarat | |
| 2003/0204836 A1 | 10/2003 | Srivastava et al. | |
| 2004/0025083 A1 | 2/2004 | Nanja et al. | |
| 2008/0148247 A1* | 6/2008 | Galler | G06F 11/3684 717/154 |
| 2009/0144698 A1 | 6/2009 | Fanning et al. | |
| 2009/0249299 A1 | 10/2009 | Farchi et al. | |
| 2009/0265694 A1 | 10/2009 | Bakowski | |
| 2010/0262866 A1 | 10/2010 | Nir-Buchbinder et al. | |
| 2010/0287534 A1 | 11/2010 | Vangala et al. | |
| 2011/0197098 A1* | 8/2011 | Sobolev | G06F 11/3676 714/38.1 |
| 2012/0089964 A1* | 4/2012 | Sawano | G06F 11/3684 717/124 |
| 2012/0266023 A1 | 10/2012 | Brown et al. | |
| 2012/0284697 A1 | 11/2012 | Choppakatla et al. | |
| 2012/0331448 A1* | 12/2012 | Tanaka | G06F 11/3676 717/127 |
| 2013/0024846 A1 | 1/2013 | Lewis et al. | |
| 2013/0055214 A1 | 2/2013 | Harrison et al. | |
| 2013/0091492 A1* | 4/2013 | Mizrahi | G06F 11/368 717/124 |
| 2013/0111267 A1 | 5/2013 | Beryoza et al. | |
| 2013/0152047 A1 | 6/2013 | Moorthi et al. | |
| 2013/0298110 A1* | 11/2013 | Boden | G06F 11/3676 717/125 |
| 2013/0311976 A1 | 11/2013 | Bhat et al. | |
| 2014/0040867 A1 | 2/2014 | Wefers et al. | |
| 2014/0096111 A1 | 4/2014 | Mahler et al. | |
| 2014/0258991 A1* | 9/2014 | Adler | G06F 11/3676 717/128 |
| 2014/0351793 A1 | 11/2014 | Bartley et al. | |
| 2014/0380277 A1 | 12/2014 | Bhagavatula | |
| 2015/0007140 A1 | 1/2015 | Boshernitsan et al. | |
| 2015/0293837 A1 | 10/2015 | Rajamanickam et al. | |

OTHER PUBLICATIONS

Rothermel et al., "Test case prioritization: an empirical study," 1999, IEEE International Conference on Software Maintenance, pp. 1-10.*

Kuhn et al., "Software fault interactions and implications for software testing," 2004, IEEE Transactions on Software Engineering, vol. 30, Issue 6, pp. 418-421.*

Amland, "Risk-based testing::Risk analysis fundamentals and metrics for software testing including a financial application case study", 2000, Journal of Systems and Software, vol. 53, Issue 3, pp. 287-295.

Bach et al., "Rapid Software Testing", Feb. 2007, <http://www.satisfice.com/rst-appendices.pdf>.

Beszedes et al., "Code coverage-based regression test selection and prioritization in WebKit", 2012, IEEE, 28th IEEE International Conference on Software Maintenance (ICSM), pp. 46-55.

Leon et al., "A comparison of coverage-based and distribution-based techniques for filtering and prioritizing test cases", 2003, IEEE, Proceedings of the 14th International Symposium on Software Reliability Engineering (ISSRE'03). pp. 1-12.

Redmill, "Exploring risk-based testing and its implications", Mar. 2004, Software Testing, Verification and Reliability, vol. 14, Issue 1, pp. 3-15.

Rothermel et al., "Prioritizing test cases for regression tesing", 2001, IEEE, IEEE Transactions on Software Engineering, vol. 27, Issue 10, pp. 929-948.

Stallbaum et al., "An automated technique for risk-based test case generation and prioritization", 2008, Proceedings of the 3rd International Workshop on Automation of Software Test, pp. 67-70.

Wang, "Fix Cache Based Regression Test Selection", Department of Computer Science and Engineering Chalmers University of Technology, Univeristy of Gothenburg, Mar. 2010, <http://publications.lib.chalmers.se/records/fulltext/122287.pdf>.

"Clover Plugin" Jenkins Wiki, Aug. 13, 2013, <http://wiki.jenkins-ci.org/display/JENKINS/Clover+Plugin>.

"Test your tests with Jester", IBM, Mar. 3, 2005, pp. 1-6, <http://www.ibm.com/developerworks/library/j-jester/>.

Rajamanickam et al., "Risk-Based Test Coverage and Prioritization", U.S. Appl. No. 15/220,465, filed Jul. 27, 2016, 48 pages.

IBM, List of IBM Patent Applications Treated as Related, Appendix P, dated Jan. 4, 2017, 2 pages.

* cited by examiner

RISK-BASED TEST COVERAGE AND PRIORITIZATION

FIELD OF THE INVENTION

The present invention relates generally to the field of application testing, and more particularly to using application test failure tracking to determine risk-based test coverage and test prioritization.

BACKGROUND OF THE INVENTION

Software testing is performed to ensure that a software product has been developed and implemented correctly and performs as expected. Testing of software product code elements is continuous throughout the development cycle, but the complexity of testing increases as code elements are integrated into modules and larger portions of the full software product in which higher levels of code interaction occur.

Exhaustive testing can be very time consuming and corrections of defects found may require extensive retesting due to interconnection of code elements.

Approaches to software testing use measurement of test coverage of the source code to indicate a thoroughness of testing. In some cases of highly complex software, testing may selectively cover specific areas of code, functions, or conditions, rather than performing a full coverage of testing. The portions of source code perceived to be complex may be given priority over more common and straight-forward portions of code, which may see only minimal testing. This is done to control the time requirements of testing.

Code coverage indicates the degree to which the source code has been tested and is often expressed in comparison or percentage of "lines of code" tested, of a total number of lines of code in the source code. Coverage criteria can add to the approach and strategy of software testing. Common coverage criteria can include calling each function in the code, executing nodes and edges of the program, and performing control structure evaluations.

Code coverage tools are available for use in software testing. Some calculate the percentage of code accessed by tests, while others promote testing of conditional code statements through possible options. Still other tools determine a complexity level of source code portions based on the presence, number, and amount of nesting, and attempt to prioritize testing based on this perceived complexity.

SUMMARY

Embodiments of the present invention disclose a method for indicating significance of tested code statements. A processor receives a rule containing a first set of code statements in which the rule includes at least one of an absolute significance indicator rule and a generic significance indicator rule. A processor comparing the first set of code statements of the rule to a second set of code statements of a plurality of code statements of a source code, such that a comparison of the first set of code statements contained in the rule to the second set of code statements of the plurality of code statements of the source code is performed concurrent with testing of a compiled version of the source code, and such that determining a correspondence between the first set of code statements of the rule and the second set of code statements of the plurality of code statements of the source code is enabled by annotations applied to the source code by code instrumentation. A processor, in response to determining a correspondence of the first set of code statements of the rule to the second set of code statements of the plurality of code statements of the source code, applies a weight modifier to the rule, such that the weight modifier assigns a weighted value to the first set of code statements of the rule, and such that the weight modifier of an absolute significance indicator rule additionally adjusts the weighted value by a multiplier. A processor, in response to determining a correspondence of the first set of code statements of the rule to a third set of code statements of the plurality of code statements of the source code, applies the weight modifier to the rule a second time, such that the rule includes a first instance of the weighted value and the weight modifier assigns a second instance of the weighted value to the first set of code statements of the rule. A processor applies a cumulative weight value of the rule to the second set of code statements and a cumulative weight value of the rule to the third set of code statements of the plurality of code statements of the source code, such that the cumulative weight value indicates a significance of the second set of code statements and the third set of code statements, and is based on accumulated applications of the weighted value to the rule by the weight modifier. A processor determines a priority of subsequent testing for the second set of code statements and the third set of code statements, of the plurality of code statements of the source code, based on the cumulative weight value applied to the second set of code statements and the third set of code statements, and a processor, in response to receiving a request for a test coverage report, displays the cumulative weight value applied to the second set of code statements and the cumulative weight value applied to the third set of code statements of the plurality of code statements of the source code, in the test coverage report.

DETAILED DESCRIPTION

Embodiments of the present invention recognize that current approaches to application code testing focus on test coverage determined by tracking the "lines of code" tested, and often represent test coverage as a percentage of the total lines of code in the application that have been tested. Such approaches do not take into consideration the risk associated with the code tested or omitted from testing, based on code failure, potential for failure, or code complexity determined during development or testing. Similarly, such approaches fail to take into account the level of importance or usage of sections of the code. Embodiments of the present invention identifies code statements with a risk level and/or importance during or subsequent to testing and applies weight modifiers which assign or adjust values to the sections of code identified as including risk, importance, or failure indicators. The weight modifiers applying weighted values associated with sections of the code provide a quantification that can be used to prioritize testing or focus more thorough testing in the sections of code having higher risk or importance.

Embodiments of the present invention assess risk levels of code to be tested based on historical test failures, by assigning quantitative weighting to sections of source code tested based on historic test execution results to improve test cases and prioritization and coverage of testing.

Figure 1:
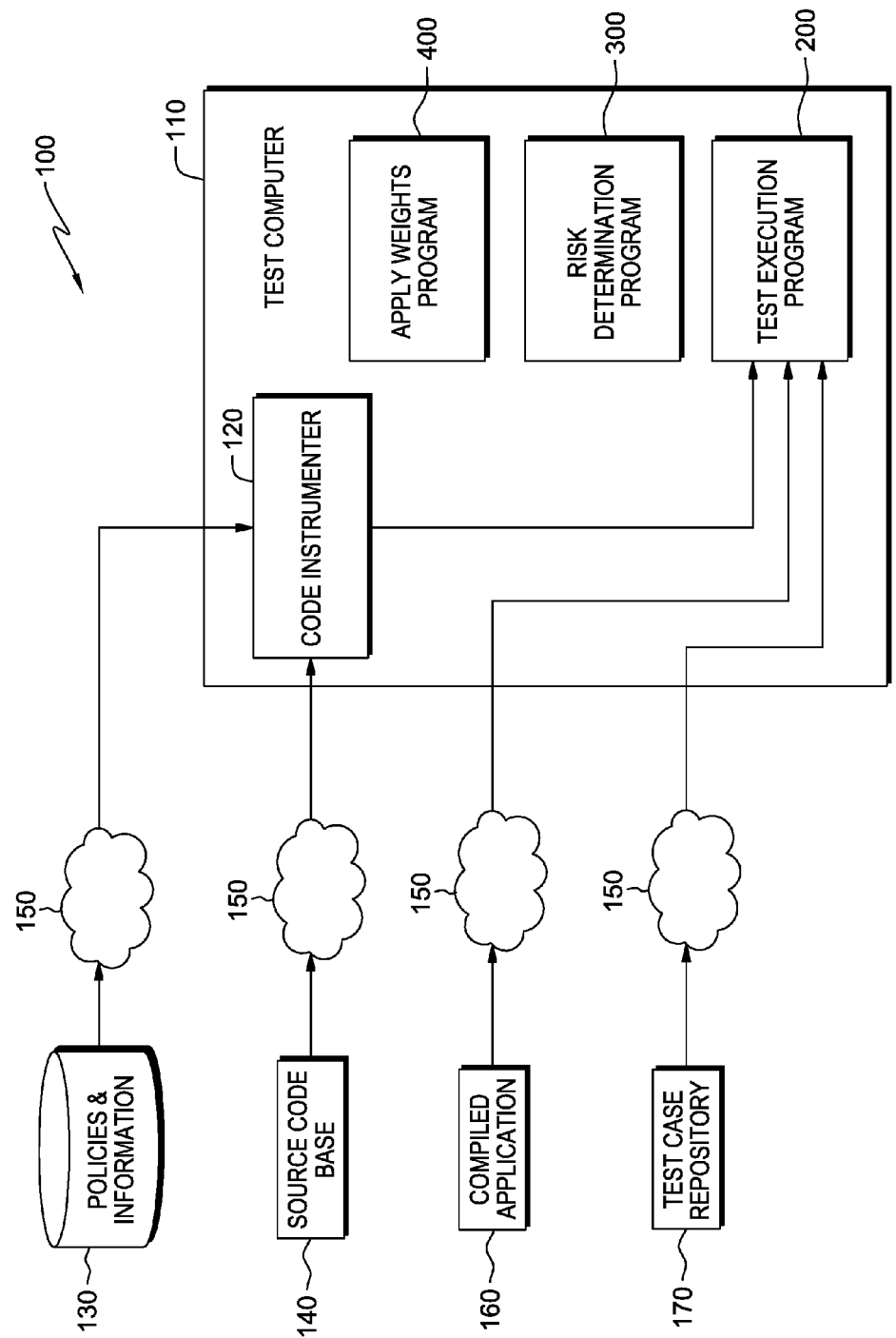
FIG. 1 is a functional block diagram illustrating a distributed application test environment, in accordance with an embodiment of the present invention.

The present invention will now be described in detail with reference to the Figures. FIG. 1 is a functional block diagram illustrating a distributed application test environment, generally designated 100, in accordance with one embodiment of the present invention. Application test environment 100 includes test computer 110, code instrumenter 120, policies and information repository 130, source code base 140, compiled application 160 and test case repository 170, interconnected through network 150.

Network 150 can be, for example, a local area network (LAN), a wide area network (WAN), such as the Internet, or a combination of the two, and can include wired or wireless connections. Network 150 can be a communication fabric within or between computer processors, such as a PCIe bus. Network 150 interconnects test computer 110, code instrumenter 120, policies and information repository 130, source code base 140, compiled application 160 and test case repository 170. In general, network 150 can be any combination of connections and protocols that will support communications via various channels between test computer 110 and policies and information repository 130, source code base 140, compiled application 160 and test case repository 170, of distributed application testing environment 100, in accordance with embodiments of the present invention.

Test case repository 170 is a source of test cases used for testing application code. Test cases are created to provide specific input or establish specific conditions to evaluate one or more sections of application code being developed, to determine if the code operates and behaves as expected. Test case repository 170 may be one or more, or a combination of files, collections of files, databases, or storage devices in which test case data resides or is stored. In one embodiment of the present invention, test case repository 170 may represent multiple repositories of test cases.

Compiled application 160 is a stored version of the application being developed and tested, which is compiled and is run by test case execution program 200. Compiled application 160 may include a portion of the code for the application being developed, or may include all of the code for the application being developed. Compiled application 160 code may be code that is being upgraded to a new version with new features and/or corrected behavior, or may be an application within a development process that has not been released for production use. Compiled application 160 may be representative of an application that operates on existing or future operating system platforms. Compiled application 160 includes code that may be stored in one or more files on one or more storage devices accessible to test computer 110. Hereafter, reference to "code for the application being developed" may include code for a new application, code correcting behavior in an application released to production, new versions of a released application or other status of application code in which testing is required. The code for compiled application 160 may be stored as compiled code, or may be stored as un-compiled code, which is compiled prior to running in code testing operations.

Source code base 140 is the source code written for the application being developed. Source code base 140 represents the most current version of source code and may include all the source code for the application being developed and tested, or may be some portion of the source code for the application being developed and tested. Source code includes programming language text and is readable, whereas compiled code is in a machine executable format and is not readily readable.

Code instrumenter 120 is an available instrumentation technology, shown residing on test computer 110. Code instrumenter 120 applies annotations and instructions to the lines of code being tested. In one embodiment of the present invention, code instrumenter 120 assigns an initial (default) weight value to the lines of code of the application to be tested. The instrumentation applies tags and instructions to the tested code and may apply tags and instructions to the compiled code being tested and the source code such that the pattern of the code in a policy rule, which includes at least one code statement, may be compared to a corresponding pattern in the tested code to determine a match. In one embodiment of the present invention, code instrumenter 120 is applied to the compiled code and/or source code in embodiments in which test monitoring is performed concurrent with application code testing. The instrumentation does not change the compiled code, but enables determining correspondence between code statements of the source code and code statements of the compiled code being tested. In another embodiment, instrumenter 120 may provide annotation of test results performed by an external coverage tool.

Policies and information 130 is a repository in which policies written to apply to application code being developed during or after testing, are stored. Policies and information 130 also includes information associated with the number of matches determined between policy rules and the application code tested. Policies and information 130 may be one or a combination of, one or more files, one or more folders, one or more databases, and one or more tangible storage devices, capable of storing policies and information associated with the policies. Policies and information 130 may be accessible to test computer 110 via network 150, as depicted in FIG. 1, or may be connected directly to or reside within components of test computer 110 (not shown).

Policies are written and used to identify and match sections of code that represent an absolute failure indicator (AFI) and/or a general failure indicator (GFI). Policies include rules to be applied to code that has been tested or is currently being tested. A rule may include either or both of an AFI or GFI. An AFI includes one or more specific code statements, which indicate that a specific failure has occurred, for example, an exception throw, a log message, or system state message to a user. A code statement is analogous to a line of programming code, and a block of code contains multiple lines of programming code that may be functionally related. A policy also includes identification of a rule associated with the policy, and tracks and stores a weighted value associated with the rule.

A GFI includes a code statement or block of code that indicates a failure has occurred but cannot be specifically traced to a statement, for example a generic "catch" statement. A GFI may also include sections of code that have a potential for failure, for example, error handling blocks, public access methods, detailed programmer annotations, and complex blocks of code such as iterative sections, recursion and nested conditional code segments. A policy rule includes an AFI or a GFI, referred to as an AFI rule or a GFI rule, respectively. Policy rules are applied to code tested or being tested, and the code statements or patterns of the rules are compared to sections of the application code to determine a match. In one embodiment of the present invention, a match results in an adjustment of a weight modifier, for example, increasing a number, value, or count associated with the rule. The weight modifier value associated with the rule is stored in an information table within policies and information 130. As testing of the application code continues and progresses, the number associated with the matching of a rule with corresponding source code statement will be adjusted by the weight modifier, reflecting a higher risk or higher importance of this section of code.

As a result of iterations of testing, the weight modifiers associated with a rule may indicate higher levels of risk, importance, usage, or other factors making the corresponding code statements of the source code "significant", suggesting a need in assuring adequate testing is performed on these respective code statements. Embodiments of the present invention recognize adjusted values of rule weight modifiers indicate sections of tested code having significance with respect to the risk, importance, usage and other factors associated with the code. The absolute failure indicators and generic failure indicators may be alternatively considered and referred to as absolute significance indicators and generic significance indicators.

Test computer 110 is a computing device which performs testing operations on application code being developed, modified, updated, or repaired. Test computer 110 can be a laptop computer, tablet computer, netbook computer, personal computer (PC), a desktop computer, a personal digital assistant (PDA), a smart phone, or any programmable electronic device capable of operating test execution program 200, risk determination program 300, and apply weights program 400. Test computer 110 receives, policy and historic test information, source code, compiled application code and test cases, via network 150, and may communicate or connect with various components and other devices within distributed database environment 100 (not shown). Test computer 110 includes internal and external hardware components, as depicted and described in further detail with respect to FIG. 5.

Test computer 110 includes test case execution program 200, risk determination program 300, and apply weights program 400. Test case execution program 200 performs the testing on the application code being developed and receives multiple inputs. In one embodiment, test case execution program 200 receives instrumented source code from code instrumenter 120, policies from policies and information 130, and source code from source code base 140, which is annotated and tagged by code instrumenter 120. Test case execution program 200 also receives application code, which is already compiled or is compiled by test case execution program 200 from compiled application 160, and test cases from test case repository 170. In another embodiment, test case execution program performs testing on the application code and provides test results, which are used by risk determination program 300.

Test case execution program 200 performs test case testing on the application code, and determines a result of the testing, records results, and enables test monitoring by risk determination program 300. Test case execution program 200 may iteratively perform multiple test cases and may be applied to portions of the software application code being developed or the entire amount of software application code.

Risk determination program 300 performs test monitoring on the application code being tested by test execution program 200. Risk determination program 300 uses policies to identify failure indicators within the application code being tested, by applying and matching rules of the policies to corresponding statements or sections of the application code. Risk determination program 300 utilizes rules associated with AFIs and GFIs, and in one embodiment of the present invention, the count or number associated with AFI rules matching application code being tested, are multiplied by a constant to reflect the risk associated with an absolute fail indicator. A match increases a count or number associated with the weight modifier of a policy rule, and iterative matches continue to increase the number associated with the policy rule. Higher numbers are indication of higher risk or higher importance of the code corresponding to the rule, and test coverage report include the risk/importance numbers to clearly identify test coverage from a perspective of risk and importance of the code.

Apply weights program 400 monitors for a request to generate a test coverage report, and responds to the request by performing a calculation on the cumulative weight modifiers for policy AFI rules to distinguish absolute failure indicators as having higher risk or importance for the application than generic failure indicators. Apply weights program 400 applies the policy rule weight modifiers to corresponding code of the source code base, to include the weights as a qualitative indicator of higher risk areas of code along with test coverage information, in test coverage reports.

Figure 2:
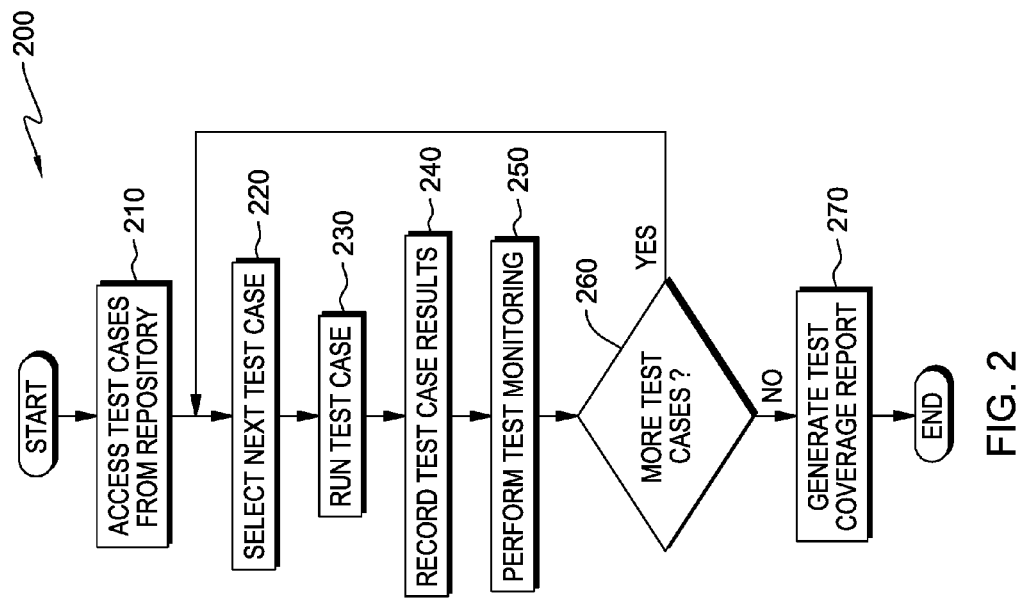
FIG. 2 is a functional block diagram depicting the operational steps of a test execution program, performed on a computing device of the application test environment of FIG. 1, in accordance with an embodiment of the present invention.

FIG. 2 is a functional block diagram depicting the operational steps of test execution program 200, performed on a computing device of the application test environment of FIG. 1, in accordance with an embodiment of the present invention. Test execution program 200 accesses test cases from the test case repository (step 210). For example, test repository 170 includes stored test cases for testing the application being developed. Test execution program 200 accesses test case repository 170 (FIG. 1) via network 150 and accesses the test cases that will be applied during a current testing session.

Test execution program 200 selects the next test case to run in the testing session (step 220). In one embodiment of the present invention, the test cases to be run in the current test session are designated to be run in an order determined by input received via a user interface of test execution program 200. Test execution program 200 initially selects the first designated test case and subsequently selects the next test case in the order that has not been run. For example, in a current session of testing, test cases are designated to be run in the order of, test case A, test case B, test case C, and test case D. As testing is initiated, test execution program 200 selects test case A to be run, and subsequently will select test case B, followed by selecting test case C, and so on.

Test execution program 200 runs the test case (step 230). Having selected the next test case, for example test case A, test execution program 200 runs the test case, which involves executing the code to be tested and applying conditions, inputs, and selections as designated within the test case.

Test execution program 200 records the test case results (step 240). Having run the test case by executing the code to be tested and applying the conditions defined in the test case, test execution program 200 records the results of the test case by saving the results to a storage device accessible to test computer 110. The results are stored and accessible to be viewed, used by risk determination program 300, analyzed, or included in reporting.

Having recorded the test case results, test execution program 200 performs test monitoring (step 250). Test monitoring is described in greater detail with respect to the discussion of FIG. 3.

Test execution determines if there are more test cases to run in the test session (decision step 260), and based on determining that no additional test cases remain (step 260, "NO" branch), test execution program 200 generates a test coverage report (step 270). Test execution program 200, using recorded test case results, generates a test coverage report designating the application code covered by the test cases and the results indicating whether the code executed the test case successfully or if errors or failure occurred. Having generated a test coverage report, text execution program 200 ends.

For the case in which test execution program 200 determines there are more test cases to be run in the current test session, text execution program 200 selects the next test case from the test cases accessed from the repository (return to step 220), and continues as described above.

Figure 3:
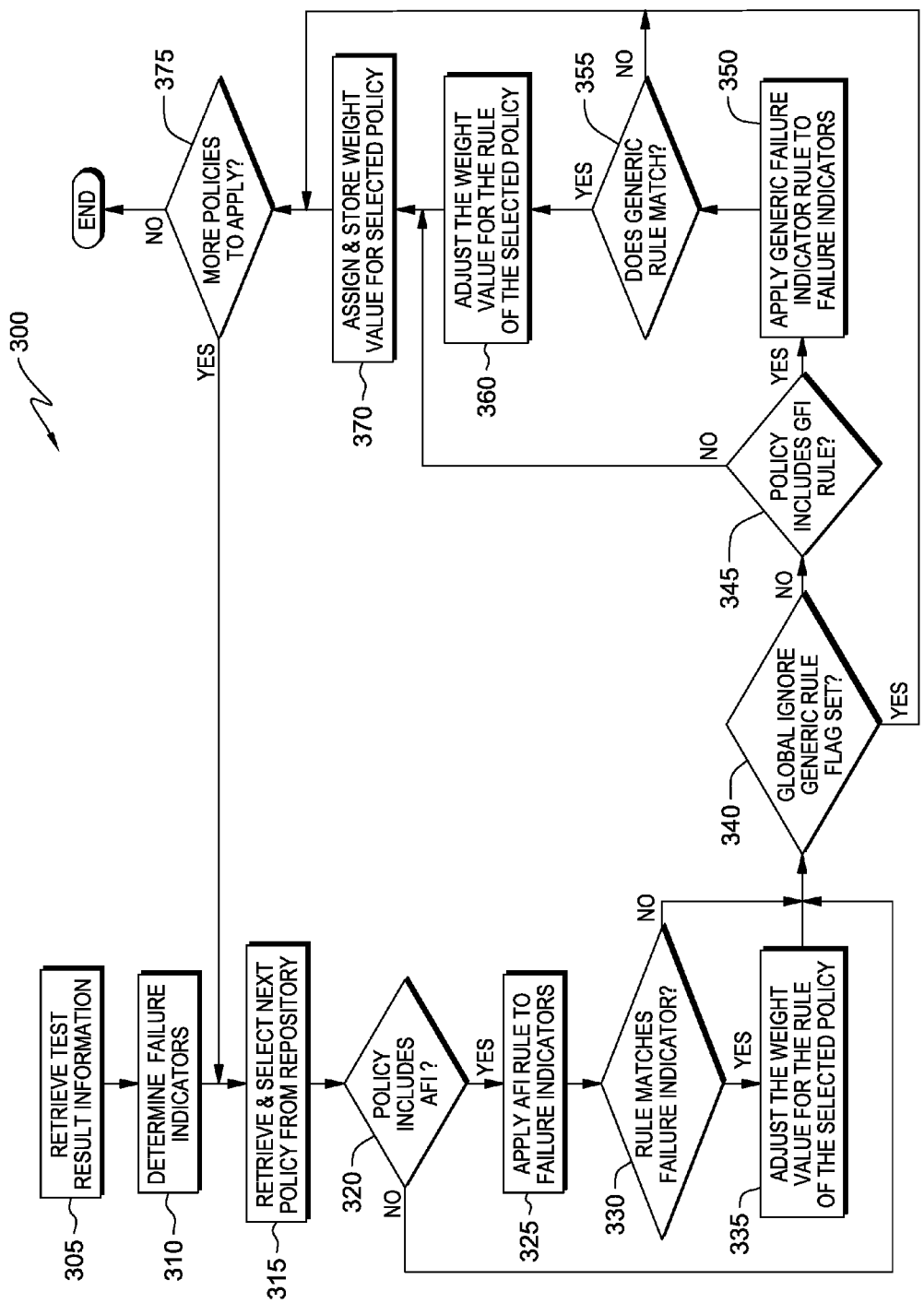
FIG. 3 illustrates operational steps of a risk determination program residing on a computing device within the application test environment of FIG. 1, in accordance with an embodiment of the present invention.

FIG. 3 illustrates operational steps of risk determination program 300 operating on test computer 110 within the application test environment of FIG. 1, in accordance with an embodiment of the present invention. The operational steps of risk determination program 300 are performed within the test monitoring activity (step 250) of test case testing as performed by test execution program 200.

Risk determination program 300 accesses and retrieves the test result information (step 305). In one embodiment of the present invention, as a test case is run, risk determination program 300 retrieves the test result information. In another embodiment, test result information is received by risk determination program 300 subsequent to testing of one or more test cases. The test result information includes the compiled application code and instrumented source code corresponding to the application code being tested, as well as information associated with the test case run during testing of the application code.

Risk determination program 300 determines the failure indicators, within the source code corresponding to the application code being tested (step 310). Source code statements corresponding to the tested application code, are analyzed by risk determination program 300 to determine the code statements associated with failure indicators. In one embodiment of the present invention, failure indicators may be of two types, absolute failure indicators (AFI) and generic failure indicators (GFI). Absolute failure indicators include exception handling code constructs, system state notifications, and custom constructs that are application specific or situational specific. Generic failure indicators may include exception handling statements or blocks, access and usage constructs, system state notifications, complex sections of code, and custom constructs. Constructs refer to one or more statements of code within a software application that enable or preform actions, decisions, or instantiations. For example, statements of code that connect to a device or web address external to test computer 110, to receive input or provide output, represents one or more code constructs. Similarly, an exception handling block of code statements, a block of nested conditional statements, or an application programming interface (API) for connection to the application from external sources, may represent one or more code constructs.

Exception handling code is designated to respond to unexpected behavior of the application and respond with designated action. For example, a "throw" command may be used in a java language program to handle exceptions, or in C++ a section of code may be enclosed within a "try" block to handle exceptions. Exception handling code may be identified by inspecting for exception handling terms within the source code. Exception handling code is used for code, which when executed, may encounter unexpected results and may need actions to be taken for the application to continue. Since an occurrence of an exception is a type of application failure, the exceptions determined within the source code are considered absolute failure indicators.

Other types of absolute failure indicators include logging of messages of high severity or presentation of notifications, which may indicate a state or condition that requires action or intervention, and custom constructs. For example, in some cases messages or notifications are presented to a user to confirm or take action. Message logging and notification of a high severity to a user may also be considered as absolute failure indicators. Custom constructs are specific to the application or specific scenarios that may occur during the operation of the application, and may be considered absolute failure indicators.

Generic failure indicators are not specifically associated with exceptions or an instance of code failure, rather they are considered areas of the code that have a high potential for failure, risk, or have high importance to the successful functionality of the application. For example, the use of a "try" block in exception handling makes use of "catch" statements that are associated with specific known causes of an exception; however, a final catch statement not associated with a specific exception may be used to collectively handle all other exceptions for which a specific catch statement has not been included, and this catch statement may be considered a generic failure indicator, since it is not directed to a specific fail cause. Similarly complex code may be considered as a generic failure indictor since it may not actually fail, but due to branching and complexity, may have a higher probability of failure. Examples of complex code considered as generic failure indicators include recursion, nested or complex conditional constructs, and highly iterative sections of code.

Other code that may be considered as generic failure indicators include access and usage specifying code. Methods that are "public" are accessible to other methods within the application and external to the application. A high dependence on access to this part of the code qualifies it as a generic failure indicator, as do instances of (APIs) for similar usage dependency. In some cases a programmer's annotation of source code may indicate known or potential risks or problems with code, and keywords of the annotations may be used to identify the section of code as a generic failure indicator.

The absolute and generic failure indicators mentioned herein are meant as examples to further explain and differentiate absolute failure indicators and generic failure indicators, and are not intended to represent an exhaustive list. Policy rules may include code that has significant importance in usage and/or connectivity, in addition to complex code and error related code constructs, such that rules in general may also be referred to as "significance indicators". Absolute failure indicator rules may therefore be more generally referred to as absolute significance indicator rules, and generic failure indicator rules may be generally referred to as generic significance indicator rules.

Having determined the failure indicators in the source code that corresponds to the application code tested, risk determination program 300 retrieves and selects the next policy from a repository (step 315). Policies have been previously written for the application being tested and have been saved in an appropriate storage device, such as a file stored on a hard drive, a database, an optical storage device such as a compact disc (CD) or digital video disc (DVD), or a non-volatile storage card such as a secure digital (SD) card, or policies may be stored, at least temporarily, in random access memory (RAM). The policies are written with knowledge of the programming language constructs used in the source code, and may be unique to the application being tested, or may also include policies associated with code constructs having known higher risk or higher importance. For example, policies may be written by a collaboration between a software tester and an application developer. As source code is developed, policies may be written that correspond to particular constructs of the software code. In embodiments of the present invention, additional policies may be written and added to the policy repository based on results of test case testing. Once retrieved, at least one policy may be held in primary memory (RAM) of test computer 110, for example.

Having retrieved policies from the repository, risk determination program 300 selects the next policy. The next policy may initially be the first selected policy of multiple policies retrieved from the policy repository. Risk determination program 300 will apply a rule of the policy to the source code corresponding to the application code being or having been tested. The policy as retrieved from the policy repository, for example, policies and information 130, includes an identification (ID) corresponding to the policy, and may include an absolute failure indicator rule, a generic failure indicator rule, or both.

After selecting the policy, risk determination program 300 determines whether the policy includes an absolute failure indicator (AFI) rule (decision step 320), and determining that the selected policy does include an AFI rule (step 320, "YES" branch), risk determination program 300 applies the AFI rule to the failure indicators (step 325). Applying the AFI rule to the failure indicators determined in the source code involves risk determination program 300 comparing the text included within the AFI rule to each of the failure indicators of the source code corresponding to the application code tested. For example, the AFI rule can be considered a first set of code statements, and risk determination program 300 compares the first set of code statements of the rule to a second set of code statements within the plurality of code statements of the source code. In one embodiment of the present invention, the second set of code statements of the source code corresponds to a section of compiled code being tested, or in another embodiment, corresponds to a section of compiled code that has been tested.

Risk determination program 300 determines if the comparison of the policy AFI rule is a match to the failure indicator (decision step 330), and determining that the AFI rule matches a failure indicator determined within the source code of the application tested (step 330, "YES" branch), risk determination program 300 applies the value of the weight modifier, hereafter, weighted value, to adjust the weighted value of the AFI rule of the selected policy (step 335). When a policy AFI rule is determined to match a failure indicator within the source code, the weighted value of the AFI rule of the selected policy is adjusted by risk determination program 300. For example, if the AFI rule of the selected policy is at a weighted value of 1, matching of the rule to corresponding failure indicator of the source code may result in risk determination program 300 adjusting the weighted value of the rule to 2. A subsequent test iteration in which the same policy is selected and a match is again found between the AFI rule of the policy and a failure indicator of the source code for the tested application, the weighted value may be adjusted to 3, for example.

In the case in which the selected policy does not include an AFI rule (step 320, "NO" branch), risk determination program 300 determines if a global ignore generic rule flag is set (decision step 340), and based on determining that the global ignore GFI rule flag is set (step 340, "YES" branch), risk determination program 300 determines if there are more policies to apply (decision step 375). In one embodiment of the present invention, risk determination program 300 may include an option in which generic failure indicators are ignored, and the focus of applying rules for risk and importance of code is directed to absolute failure indicators. This option may be a user selection made within the settings of risk determination program 300 or may be based on conditions of the testing, such as the number of tests in a sequence of test iterations.

If the selected policy does not include an AFI rule, or if the AFI rule is not determined to match a failure indicator within the source code of the tested application (step 330, "NO" branch), risk determination program 300 determines if a global ignore generic rule flag is set (decision step 340), and if the global ignore generic rule flag is determined to be set, risk determination program 300 proceeds to determine if there are more policies to apply (decision step 375).

In determining whether the global ignore generic rule flag is set, if risk determination program 300 determines that the flag is not set (step 340, "NO" branch), risk determination program 300 determines if the selected policy includes a GFI rule (decision step 345), and determining that the policy includes a GFI rule (step 345, "YES" branch), risk determination program 300 applies the GFI rule to failure indicators determined within the source code of the tested application (step 350). Applying the GFI rule to the failure indicators determined in the source code involves risk determination program 300 comparing the text included within the GFI rule to the code statements of the source code corresponding to the application code tested, which includes failure indicators of the source code. For example, risk determination program 300 compares the text of the GFI rule for the selected policy, which may be a software language construct containing particular nested conditional statements, which are iterated a high number of times. Risk determination program 300 compares this group of conditional statements to the failure indicators determined within the source code corresponding to the tested application code, and finding a match between the conditional statements of the GFI rule of the policy and code statements of the source code, risk determination program 300 applies the weight modifier of the rule, which adjusts the weighted value of the GFI rule of the policy. A weight modifier, when applied to a policy rule, adjusts the weighted value associated with the rule. Examples presented herein are meant to illustrate the adjustment, but not limit the manner in which an adjustment to the weighted values of a rule can be applied.

A weighted value may be incremented by an integer value, decremented, multiplied, divided, or have any mathematical function applied in a way that distinguishes the set of code statements associated with the rule as significant with respect to risk, usage, or importance of the corresponding set of code statements within the tested software application that may affect the application's successful operation and performance.

For the case in which risk determination program 300 determines that the policy does not include a GFI rule (step 345, "NO" branch), risk determination program 300 assigns and stores weight modifier adjustments for the selected policy (step 370) and determines if there are more policies to apply to the tested application source code (decision step 375). The adjusted AFI weight modifier, also referred to as the weighted value, is assigned to the AFI rule of the selected policy, which has a corresponding policy ID, and is stored for use in subsequent test iterations and reporting. Policy IDs and rule weight modifiers may be maintained in a table and stored within a file, a database, or other data structure capable of storing the policy ID, rules and respective weight modifiers, which is accessible to risk determination program 300 running on test computer 110.

Having applied the GFI rule of the selected policy to the failure indicators of the source code, risk determination program 300 determines if the generic rule matches a failure indicator (decision step 355), and determining that the GFI matches a failure indicator (step 355, "YES" branch), risk determination program 300 increases the weight value for the GFI rule of the selected policy (step 360). When a policy GFI rule is determined to match a failure indicator within the source code, the weighted value of the GFI rule of the selected policy is adjusted. For example, if the GFI rule of the selected policy is at a weighted value of 10, matching of the rule to a corresponding failure indicator of the source code results in risk determination program 300 to adjust the weighted value of the rule to 11. A subsequent test iteration in which the same policy is selected and a match is again found between the GFI rule of the policy and a failure indicator of the source code for the tested application, the weighted value may be adjusted to 12, for example.

Although integer units of 1 are used as increases in the examples, embodiments of the present invention may use any scale of adjustment, or may choose any direction of adjustment of the weighted value associated with a policy rule. Embodiments of the invention use the matching of policy rules and failure indicators within corresponding source code of the application code tested, to apply a weight modifier value. The weighted value is associated with statements or blocks of code that indicate areas of code having higher risk or higher importance to the performance of the application tested. Assigning the weight modifiers of rules to their corresponding application source code and including the weight modifiers in a test coverage report, includes the perspective of areas of risk and importance when reviewing and assessing testing coverage. A policy rule may be applied and compared to multiple instances of a failure indicator within the source code, and each match results in an increase to the weight modifier of the policy rule.

Having matched a GFI policy rule to a failure indicator of the source code, and adjusted the weight modifier of the rule, risk determination program 300 assigns and stores the weight modifiers for the selected policy (step 370). The adjusted GFI rule weight modifier of the selected policy is updated in the information associated with the policy ID and is stored for use during subsequent testing and reporting. The information associated with a policy and the respective rules of the policy may be stored on a storage component of test computer 110 or may be stored on a storage device accessible by test computer 110. During subsequent instances of testing in which a rule is compared to failure indicators within source code corresponding to the application code being tested, the magnitude of the weight modifier of the rule is adjusted resulting in a cumulative weight modifier for the rule.

For the case in which risk determination program 300 determines that the GFI rule of the selected policy does not match the failure indicators determined within the source code of the tested application (step 355, "NO" branch), risk determination program 300 proceeds to determine if there are more policies to apply (step 375), and continues as discussed above.

Risk determination program 300 determines if there are more policies to apply (decision step 375), and determining more policies are available to apply (step 375, "YES" branch), risk determination program 300 loops to step 315 to retrieve and select the next policy from the repository, and proceeds as described above. For example, after applying a third policy to the failure indicators determined to be within the source code of the application, risk determination program 300 determines that there is a fourth policy, and retrieves the fourth policy from the repository and applies a rule of the policy, comparing the rule to the determined failure indicators.

For the case in which risk determination program 300 determines that there are no additional policies to be applied to the failure indicators of the application source code (step 375, "NO" branch), risk determination program 300 ends. The apply weights program 400 module remains actively monitoring for a request to generate a test coverage report in which the weight modifiers of policy rules are applied to corresponding code of the source code base.

Figure 4:
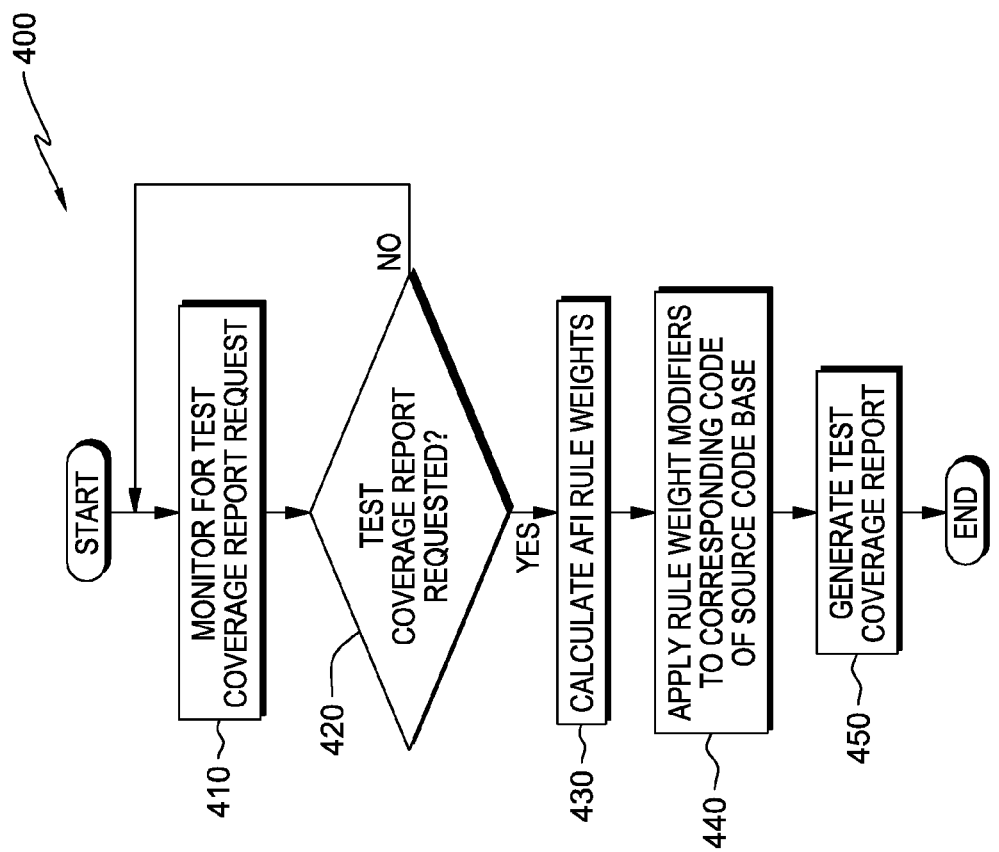
FIG. 4 illustrates operational steps of an apply weights program residing on a computing device within the application test environment of FIG. 1, in accordance with an embodiment of the present invention.

FIG. 4 illustrates operational steps of apply weights program 400 residing on test computer 110 within the application test environment of FIG. 1, in accordance with an embodiment of the present invention. Apply weights program 400 monitors for a test coverage report request (step 410). Testing of application code may involve multiple iterations of running test cases against portions or all of an application code. Having completed testing of a number of test cases and iterations of test cases, typically determined by a test designer, or application quality role, a test coverage report may be run to provide information regarding the amount of testing completed for lines or blocks of application code.

Apply weights program 400 monitors user requests for test coverage reports, and determines if a test coverage report has been requested (decision step 420) and determining that a test report has been requested (step 420, "YES" branch), apply weights program 400 retrieves policy rule information and calculates the AFI rule weights (step 430). As a result of a completed test iteration, typically for a test case, policy rules which match failure indicators within the source code of the application code tested, have weight modifiers adjusted to reflect higher risk or importance. After multiple iterations of testing, policy AFI rules and GFI rules that have matched corresponding source code of the application code tested, the values of the weight modifiers of the policy rules reflect a cumulative weight modifier, based on code matches and the number of iterations. The weight modifiers of the policy rule are stored, and may be further adjusted in subsequent test iterations or used in test coverage reporting. Apply weights program 400 retrieves the policy rule weight modifiers and performs a calculation on the AFI rule weight modifiers.

In one embodiment of the present invention, in order to establish an appropriate priority of risk consideration of code constructs corresponding to an AFI rule of a tested policy, risk determination program 300 multiplies the AFI rule weight modifiers by a constant to magnify their associated weights with respect to GFI rule weight modifiers. AFI rules are given a higher priority corresponding to a higher level risk or importance, since these are specific error handling areas of code or areas known to indicate code failure. As such, calculations are made to the weight of AFI rules to reflect the higher level of risk or code importance.

For example, after several test iterations, a policy AFI rule has a weight modifier of 110, and risk determination program 300 multiplies the AFI rule weight modifier by a constant, for example 50, which results in a calculated weight modifier of 550 for the policy AFI rule. The calculated weight modifier of the AFI rule is applied to the code in the source code base corresponding to the policy AFI rule, such that test coverage reporting includes the calculated weight modifier and will indicate a qualitative level of risk for the segment of the source code corresponding to the policy AFI rule. Similarly, policy GFI rules have weight modifiers that have accumulated through testing iterations. The cumulative weight modifiers for each GFI rule are applied to the corresponding code in the source code base, for example source code base 140.

In other embodiments, different calculations, other than multiplying by a constant, may be applied to AFIs; however, the results still differentiate the AFI rule weight modifiers as having higher risk and/or importance than GFI rules. Policy GFI rule weight modifiers are cumulative for the test iterations performed on the corresponding application code; however to distinguish risk level difference, the GFI rule weight modifiers are not further calculated, as are the AFI rules.

Having calculated the AFI rule weight modifiers for the policies, apply weights program 400 applies the policy rule weight modifiers to the corresponding code of the source code base (step 440). Apply weights program 400 applies the weight modifier value of a policy rule to the statement or block of code that corresponds to the rule. Applying the weight modifier to the source code base enables test coverage reports to include the weight modifiers, which reflect the level of risk or importance associated with the statement or block of code.

The source code base with the weight modifiers applied to corresponding statements and blocks of code is used to generate a test coverage report (step 450). The test coverage report presents information that includes the coverage of application code testing and includes the weight modifiers associated with statements or blocks of the tested application code. In one embodiment, test coverage may be presented as a percentage of lines of code covered in testing of all lines of code available to test. The test coverage report may also present information regarding the statements or blocks of application code that were tested and may further include information regarding the iterations of testing. The weight modifiers applied to the statements and blocks of source code are presented to qualitatively indicate the statements and blocks of application code that have a higher risk or importance with respect to the coverage of all statements and blocks of code tested. This offers identification of whether adequate test coverage was completed for high risk or high importance areas of code.

Having generated a requested test coverage report, which includes weight modifiers for high risk or high importance areas of code, apply weights program 400 ends.

The test coverage report will reflect the application code coverage during testing, and also include the relative risk or importance level of code statements and code blocks of the application code. Presenting both pieces of information in the report provides perspective of the test coverage specific performed on high risk areas of code or code of high importance to the function and performance of the application. This information can improve decision making of test strategy and test completion.

Figure 5:
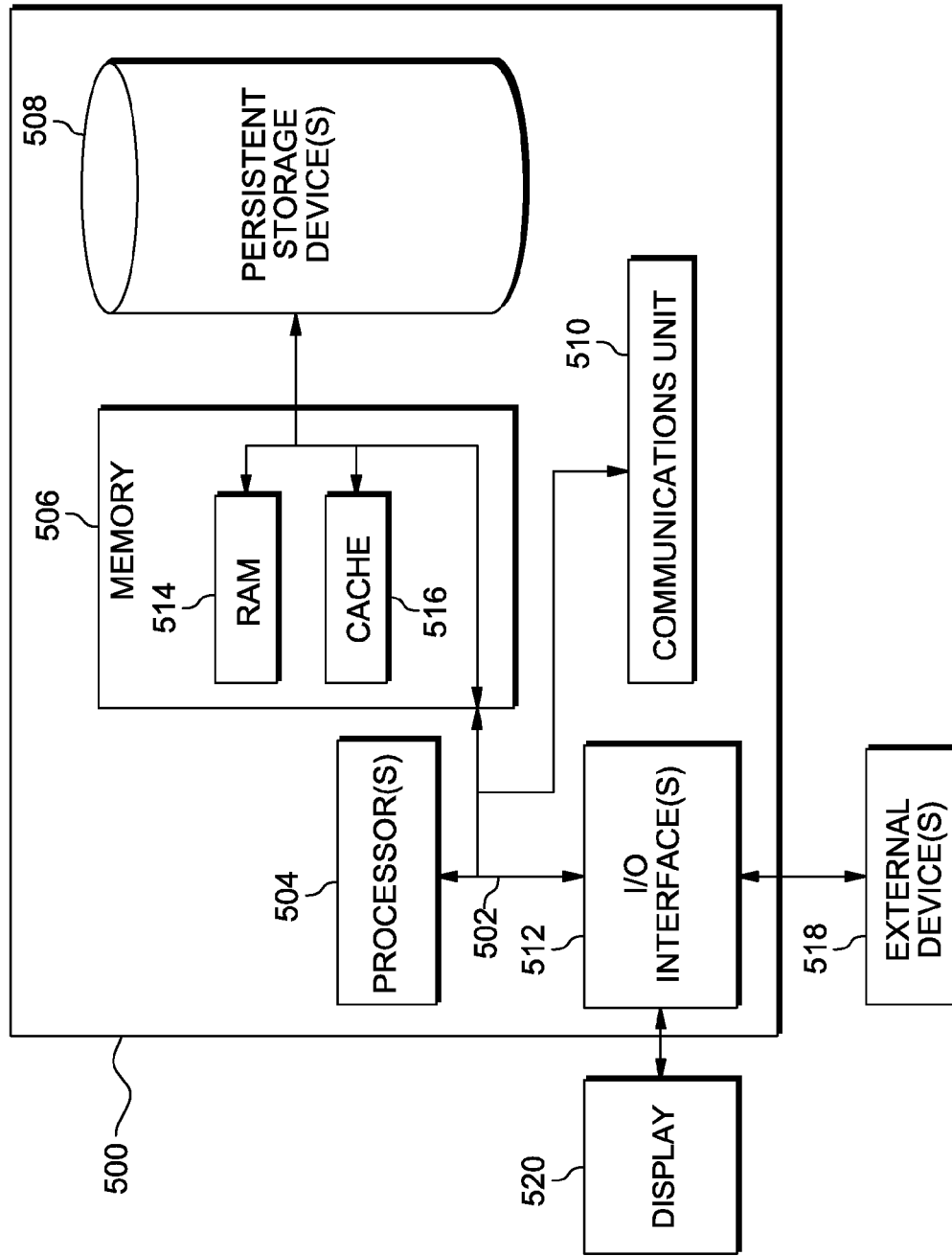
FIG. 5 depicts a block diagram of components of a computing device capable of executing the risk determination program, in accordance with an embodiment of the present invention.

FIG. 5 depicts a block diagram of components of computing device 500, capable of executing test execution program 200, risk determination program 300, and apply weights program 400, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Test computer 110 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Test execution program 200, risk determination program 300, and apply weights program 400, are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of test computer 110. In these examples, communications unit 510 includes one or more network interface cards. Communications unit 510 may provide communications through the use of either or both physical and wireless communications links. Test execution program 200, risk determination program 300, and apply weights program 400, may be downloaded to persistent storage 508 through communications unit 510.

I/O interface(s) 512 allows for input and output of data with other devices that may be connected to server computer 102. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., test execution program 200, risk determination program 300, and apply weights program 400, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for indicating significance of tested code statements, the computer system comprising:
   one or more computer processors;
   one or more computer readable storage media; and
   program instructions stored on the computer readable storage media for execution by at least one of the one or more computer processors, the program instructions comprising:
   program instructions to receive a rule containing a first set of code statements, wherein the rule includes at least one of an absolute significance indicator rule and a generic significance indicator rule;
   program instructions to compare the first set of code statements of the rule to a second set of code statements of a plurality of code statements of a source code, wherein a comparison of the first set of code statements contained in the rule to the second set of code statements of the plurality of codes statements of the source code is performed concurrent with testing of a compiled version of the source code, and wherein determining a correspondence between the first set of code statements of the rule and the second set of code statements of the plurality of code statements of the source code is enabled by annotations applied to the source code by code instrumentation
   in response to determining a correspondence of the first set of code statements of the rule to the second set of code statements of the plurality of code statements of the source code, program instructions to apply a weight modifier to the rule, wherein the weight modifier assigns a weighted value to the first set of code statements of the rule, and wherein the weight modifier of an absolute significance indicator rule additionally adjusts the weighted value by a multiplier;
   in response to determining a correspondence of the first set of code statements of the rule to a third set of code statements of the plurality of code statements of the source code, program instructions to apply the weight modifier to the rule a second time, wherein the rule includes a first instance of the weighted value and the weight modifier assigns a second instance of the weighted value to the first set of code statements of the rule;
   program instructions to apply a cumulative weight value of the rule to the second set of code statements and a cumulative weight value of the rule to the third set of codes statements of the plurality of code statements of the source code, wherein the cumulative weight value indicates a significance of the second set of code statements and the third set of code statements, and is based on accumulated applications of the weighted value to the rule by the weight modifier;
   program instructions to determine a priority of subsequent testing for the second set of code statements and the third set of code statements, of the plurality of code statements of the source code, based on the cumulative weight value applied to the second set of code statements and the third set of code statements; and
   in response to receiving a request for a test coverage report, program instructions to display the cumulative weight value applied to the second set of code statements and the cumulative weight value applied to the third set of code statements of the plurality of code statements of the source code, in the test coverage report.

* * * * *